United States Patent [19]

Voroba et al.

[11] Patent Number: 4,870,688
[45] Date of Patent: Sep. 26, 1989

[54] MASS PRODUCTION AUDITORY CANAL HEARING AID

[76] Inventors: Barry Voroba, 5509 Vinehill Rd., Minnetonka, Minn. 55345; Dennis A. Oberlander, 5622 Large Ave., Albertville, Minn. 55301

[21] Appl. No.: 868,117

[22] Filed: May 27, 1986

[51] Int. Cl.⁴ .................... H04R 25/00; H04R 25/02; H04R 29/00
[52] U.S. Cl. ........................................ 381/60; 381/68; 381/68.6; 381/69; 381/69.2
[58] Field of Search ................ 381/66, 23.1, 68, 68.6, 381/69, 69.2

[56] References Cited

U.S. PATENT DOCUMENTS

| | | | |
|---|---|---|---|
| 2,430,229 | 11/1947 | Kelsey | 381/68.6 |
| 2,950,357 | 8/1960 | Mitchell et al. | 381/69.2 |
| 3,239,093 | 3/1966 | Gath | 381/69 |
| 3,265,819 | 8/1966 | Herrmann | 381/68.4 |
| 3,345,737 | 10/1967 | Gordon | 381/68 |
| 3,414,685 | 12/1968 | Geib et al. | 381/68.6 |
| 3,448,224 | 6/1969 | Giller | 381/68.6 |
| 3,496,306 | 2/1970 | Pollack | 381/68.6 |
| 3,527,901 | 9/1970 | Geib | 381/68.6 |
| 3,542,973 | 11/1970 | Bosch et al. | 381/68.6 |
| 3,598,928 | 8/1971 | Hickox | 381/68.6 |
| 3,783,201 | 1/1974 | Weiss et al. | 381/68.6 |
| 3,852,540 | 12/1974 | Diethelm | 381/68.4 |
| 3,983,336 | 9/1976 | Malek et al. | 381/68.1 |
| 4,069,400 | 1/1978 | Johanson et al. | 381/68.6 |
| 4,375,016 | 2/1983 | Harada | 381/68.6 |
| 4,407,389 | 10/1963 | Johnson | 381/69 |
| 4,412,096 | 10/1983 | Edgerton et al. | 381/60 |
| 4,447,677 | 5/1984 | Miyahra et al. | 381/68.7 |
| 4,471,490 | 9/1984 | Bellafiore | 381/68.6 |
| 4,476,353 | 10/1984 | Haertl | 381/68.6 |
| 4,498,555 | 2/1985 | Cerny | 381/68 |
| 4,520,236 | 5/1985 | Gauthier | 381/68.6 |
| 4,548,082 | 10/1985 | Engebretson et al. | 381/68.2 |
| 4,550,227 | 10/1985 | Topholm | 381/68.6 |

FOREIGN PATENT DOCUMENTS

| | | | |
|---|---|---|---|
| 0136643 | 4/1984 | European Pat. Off. | 381/68 |
| 2350282 | 4/1974 | Fed. Rep. of Germany | 381/68 |
| 2844218 | 4/1980 | Fed. Rep. of Germany | 381/60 |
| 370369 | 10/1930 | United Kingdom | 381/68 |
| 1179692 | 1/1970 | United Kingdom | 381/68.6 |

OTHER PUBLICATIONS

*Hearing Instruments*, vol. 31, No. 7, Jul. 1980, pp. 12t, Wernick, J. S., "Modular ITE Hearing Aids-a New Generation of ITE'S".

*Hearing Instruments*, vol. 31, No. 7, Jul. 1980, pp. 16t, (List continued on next page.)

Primary Examiner—Jin P. Ng
Assistant Examiner—Danita R. Byrd

[57] ABSTRACT

The in-the-canal hearing aid has patient selected physical components and patient selected electronic components. The construction of the hearing aid and the method of providing a hearing aid for a particular patient's hearing impairment are such that a patient may personally select the best suited hearing aid during the testing process and walk away with the hearing aid he or she has personally selected. This is accomplished by allowing the patient to select a form fitting shell with a malleable covering having a hook and twist which precisely conforms to the patient's own ear. The patient then listens to sounds with or without background noise and from various directions using electronic components which conform to the specifications of the hearing aid and personally chooses those electronics which best aid or assist the patient's hearing loss. These electronics are then quickly inserted into the same shell that the patient has chosen for testing purposes and the patient may leave with the hearing aid that he or she has personally selected during the testing process. Repair or replacement is as easily accomplished by replacing the personalized shell if physical discomfort occurs or by replacing the electronics if a sound environment exists which was not anticipated during testing. The result is a truly personalized and personally chosen prothesis which is capable of on the spot delivery.

51 Claims, 6 Drawing Sheets

OTHER PUBLICATIONS

Bozarth, M. D., "The Evolution of the In-The-Ear Aid".

*Hearing Instruments,* vol. 32, No. 1, Jan. 1981, p. 7, Auditone Stock Mold ad.

*Hearing Instruments,* vol. 32, No. 4, Apr. 1981, "Modular Mold" product information, p. 34.

*Hearing Instruments,* vol. 32, No. 8, Aug. 1981, p. 52, "Standard Ear Molds" product information.

*Hearing Instruments,* vol. 33, No. 10, Oct. 1982, pp. 34–36, "Modular ITE" product information.

*Hearing Instruments,* vol. 34, No. 12, Dec. 1983, p. 53, "ITE Hearing Instrument" product information.

*Hearing Instruments,* vol. 31, No. 7, Jul. 1980, p. 18, Sommers, M., "BTE to Custom ITE to Modular ITE . . . a Logical Progression".

*Hearing Instruments,* vol. 31, No. 7, Jul. 1980, Orton, J. F., "Practical Aspects of Fitting In-The-Ear Aids", pp. 20–23.

*Hearing Instruments,* vol. 36, No. 1, Jan. 1985, Griffing, Terry S., "A Rationale for Stock ITC Aids", pp. 20–22.

*Hearing Instruments,* vol. 36, No. 5, May 1985, Basch Hearing Aid ad., p. 41.

*Hearing Instruments,* vol. 36, No. 5, May 1985, "Stock Canal Aids" product information, p. 116,

*Hearing Instruments,* vol. 36, No. 10, Oct. 1985, Griffing, T. S., "What's Ahead for ITE and ITC Aids"?, p. 46t.

Thomas F. Longwell et al., *Hearing Instruments,* "Flexible Circuitry, Leadless Components and Vapor Phase Soldering", Feb. 1983, pp. 44–47.

*Expan.* Bentzen, Oticongress 2, 1972; six page article describing the Expan Earmold.

*Oticontact,* Oticon, 1972; four page advertising pamphlet for the Expan Eartip, publ. No. OT 1656.

*Perspectives on the State of Hearing Aid Fitting Practices,* Voroba, four page pamphlet reprinted from article published in *Audecibel,* vol. 31(2), 1982, pp. 12–16.

*Hearing Aid Journal,* article entitled "*How to Assemble Custom ITE Hearing Aids*", Agnew, Jun. 1982, pp. 7–10.

*A Tool for the Optimization of Hearing Aid Fittings,* Voroba, four page pamphlet reprinted from article published in *Hearing Instruments,* Jan. 1984.

*Hearing Instruments,* article entitled "*Stock ITC: a New Fitting and Marketing Philosophy*", Staab, vol. 36, No. 1, 1985, pp. 24, 26, 28, 62.

MASS PRODUCTION AUDITORY CANAL HEARING AID

BACKGROUND OF THE INVENTION

1. Related Application

This application is related to U.S. patent application Ser. No. 867,487 filed May 27, 1986, now U.S. Pat. No. 4,759,070, entitled PATIENT CONTROLLED MASTER HEARING AID which disclosed a test apparatus for patient selection of the electronics to be incorporated into the hearing aid of this invention. The disclosure of that application is incorporated herein by reference.

2. Field of the Invention

This invention relates to the field of hearing aids, and more particularly to an in-the-canal miniaturized hearing aid which has all of its electrical and mechanical components, including a replaceable battery, contained within a prefabricated earshell assembly composed of a hollow rigid body with a soft, resilient covering fixed to the exterior.

3. Description of the Prior Art

Numerous types and designs of hearing aids for assisting persons with hearing deficiencies are known in the prior art. Typically, hearing aids incorporate a microphone for converting sound waves to electrical signals. These signals are then amplified by an amplifier circuit and sent to a receiver. The receiver converts the electrical signals into amplified sound waves and directs the sound waves toward the eardrum.

Many efforts have been made to address the tragic impairment of the hearing sense. It is believed that most of these prior contributions have assisted the patient who wore them and therefore they are important contributions. It is believed that most, however, have, while assisting in part the hearing problem, contributed other discomforts to the patient.

The majority of prior devices include a bulky protrusion from the ear, noticeable by all, indicating that the patient or user wears a hearing aid. A more recent modification relocated the controls which protruded from the ear to a position in back of the ear. Attempts to overcome the outward extending controls included the creation of custom molded in-the-canal hearing aids.

Most popular hearing aids today are very expensive and are created by this custom molding method or process by which a soft silicone or similar ear impression material is used to take an impression of the patient's ear canal which is then used to create a hard plastic shell for a hearing aid which conforms to the patient's ear. However, after the hard plastic shell is rendered from the ear impression, individual technicians at the manufacturing plant cut, buff and polish the hearing aid, often changing the configuration or mold so that it no longer is able to conform precisely to the ear from which the first impression was taken. In addition, the buffing and polishing which is done to make the aid slip into the ear becomes the surface which permits feedback of sound to occur causing an unpleasant squeal in many circumstances. For example, buffing "rough spots" generated during the ear impression process creates imperfections of the interface between the hearing aid and the inner surface of the ear. These imperfections cause "pin prick" openings which permit sound from the receiver to leak back to the microphone.

Thus, with prior custom molded hearing aids there is often a need for modifications to the device and repeated exchange between the patient and the factory. Since the components are normally glued together, the replaced hearing aid must again be constructed using the same or similar process that the first aid went through which may or may not solve the original problem. A few attempts have been made to create a standard hearing aid which fits most ears, however, the standard aid is normally round, oval or eliptical in shape so that it can fit either ear. The conical tip of such a standardized hearing aid often and frequently works its way out of the ear when the user eats, chews, yawns or talks.

Added to the complexity of providing a satisfactory hearing aid to a patient, are the various types of hearing losses which may occur. Because each patient may suffer a different type or frequency range of hearing loss the normal process includes hearing tests by an audiologist who then "prescribes" what the tester believes is the best correction which again may have to go back and forth between the factory until the specific hearing loss is matched with the characteristics of the electronics of the hearing aid. While it has probably been suggested that hearing aids could be massed produced for people with mild, moderate and severe hearing losses, due to the complexity of the hearing mechanism in the human body and patient individualities, such hearing aids could only be marginally effective for a limited number of individuals.

In-the-canal type hearing aids are made possible because of the miniaturization of batteries and necessary electronic components. These miniaturized components are incorporated into a single ear mold to be worn in the external ear, extending or penetrating into the auditory canal of a user. Locating the hearing aid in the ear, rather than on the belt or behind the ear, is preferred for acoustic reasons. The flap of the ear is shaped to be the primary sound gatherer of the human body. The crenulations of the ear are sound reflectors—they assist the brain in identifying the direction of the sound. The head, itself creates by diffraction, a shadowing of certain sound which also aids in such localization of sounds. Another advantage of this type of hearing aid is derived from its small size and, therefore, its inconspicuous cosmetic appearance. However, this advantage was previously thought to limit the production volume of in-the-canal hearing aids because miniaturization makes mass production and quality control difficult. Miniaturization has also limited the range of severity of hearing loss which can be effectively compensated for by in-the-canal hearing aids.

Generally, in-the-canal hearing aids are either individually fitted to the user's ear by a custom molding process (U.S. Pat. No. 4,471,490), or are selected from stock cylindrical canal aids having smooth polyvinyl surfaces (U.S. Pat. No. 3,852,540), usually constructed of a dental acrylic material (methylmethacrylate). Both of these methods have several disadvantages.

Individual fitting of the ear mold requires that an impression be made of the individual user's ear during a preliminary visit to the audiologist or hearing aid dispenser. The impression is sent to a craftsman for individual molding of the earshell to match the user's right and/or left auditory canals. These molds are then assembled with predetermined electronic components at the factory and fitted in the user's ears during a subsequent visit to the dispenser's office. In addition to the need for at least one subsequent visit, this method is uncomfortable because of the necessity of making an ear impression. The method is also expensive and time consuming due to the shipping, handling and individual craftsmanship required in production of each individual ear mold.

Selection of prior stock canal aids did not achieve an accurate fitting with the individual auditory canal of the user. Because stock canal aids conformed to standard requirements used in mass producing these aids, stock canal aids could not fit the individual shape of each auditory canal. The cylindrical or eliptical shape of the stock canal ads known in the prior art produced discomfort while wearing the hearing aid since it was not fitted to the individual ear canal. Also, the shape often resulted in the stock canal aid falling out of the ear since there was nothing in the shape that would "lock" the hearing aid into the ear canal.

The ear molds for stock canal aids of the past were manufactured in a cylindrical or eliptical shape so that the right and left ear molds were symmetrical and interchangeable. Recently, stock canal ear molds have added a single rearward bend to the basically cylindrical or eliptical shape of the ear mold shell. However, the same shell is still used for the right and left canals by inverting the shell before adding the cover plate. An oversized cover plate with the adjustable volume control and electronic components are attached to the shell. The periphery of the cover plate is then carved down and buffed to match the shell. The result is symmetrical right and left ear molds that are unique only because the volume control rotates in a different direction in the left ear mold than in the right ear mold.

In both custom in-the-canal hearing aids and stock canal aids, the formation of the ear mold by permanently attaching the cover plate to the shell creates serious problems in repairing and servicing these types of hearing aids. Since the electronic components are permanently sealed within the ear mold, the ear mold must be cut apart to service or replace any components which are defective. The replacement of defective electronic parts, for example, the microphone or receiver, may also alter the response characteristics of the hearing aid. Thus, servicing or repairing in-the-canal hearing aids, particularly including warranty repairs, is an expensive process which cannot typically be done at the hearing aid dispenser's store or office and which usually results in the hearing aid performing very differently after it has been serviced at the factory. In fact, warranty repairs are the single largest cost in the hearing aid industry, resulting from the patient's dissatisfaction with the prescribed and custom manufactured hearing aid.

Another drawback with both types of in-the-canal hearing aids known in the prior art is that the electronic components incorporated into these hearing aids are not specifically chosen by user selection. Currently, most manufacturers and hearing aid dispensers prescribe a certain combination of electronic components to be used in a hearing aid based upon the graphic results of the patient's audiogram. The audiogram chart shows the results of a hearing threshhold response or hearing acuity test performed by an audiologist or hearing aid dispenser using an audiometer. The audiometer consists of a pair of receivers placed in the user's ears, usually in the form of a headset, which are connected to a tone generating device. The operator varies the tones generated and inquires whether the patient can detect the generated tones at a variety of frequencies and amplitudes. The result of this process is that the hearing aid that the patient receives is not based on the patient's selected preference for a combination of electronic components. Rather, the components are usually selected from a prescription generated by the audiologist or hearing aid dispenser on the basis of the audiogram and/or the patient's response to the acuity tests.

Additionally, each manufacturer has its own method for interpreting the prescription and the audiogram into a specific combination of electronic components that are incorporated in the hearing aid. Complexity is added to the process because even the patient's own ear canal changes the prescription when the finished hearing aid is inserted into the patient's ear canal. This is due to acoustical "resonant" interactions between the ear canal and the characteristic sound output of the aid. The canal is a resonant chamber which will react differently to different frequencies for different patients. In addition, different standing wave patterns may develop for different patients depending on the frequency response of the aid and the patient specific spacing of the receiver and the patient's own eardrum, as well as ear canal geometry.

A few hearing aid dispensers use a master hearing aid device in an attempt to present simulations of different combinations of electronic components for a user to select among. With a typical master hearing aid, the user is given a set of headphones connected through the master hearing aid to an external microphone or external noise source. In a random manner the user is then asked to express a preference among the various simulated combinations. In practice, however, no master hearing aid achieves the goal of providing a hearing aid specifically chosen by user selection. Because a patient's hearing is tested on a device separate and distinct from the hearing aid eventually given to the patient, the characteristics of the device the patient tested with and the device the patient eventually receives are different.

SUMMARY OF THE INVENTION

The present invention involves a mass produced automatable canal hearing aid capable of standardized fabrication which is designed to overcome the above-identified problems in the prior art. The microphone, receiver, amplifier, and battery used in capturing and amplifying the sound waves received at the user's ear are all wholly contained within a prefabricated modular sound assembly which snaps into a patient selectable prefabricated earshell assembly. The prefabricated earshell assembly is constructed from a hollow rigid body with a soft, resilient covering affixed to the exterior. The rigid body and covering have at least one opening to the patient's environment and at least one opening to the eardrum. The opening to the patient's environment is closed by a detachably interconnected cover module.

In the preferred embodiment, the prefabricated earshell assembly has a hollow rigid body of singular size and shape with a soft, resilient covering of one of a plurality of preaffixed shapes and thicknesses. The hollow rigid body has a generally D-shaped opening to the patient's. environment with the curved portion oriented toward the back of the ear and a tapered portion narrowing to the opening to the eardrum and having a forward and inward hook and an upward twist. Thus, the right and left earshell assemblies, although mirror images, are unique and non-interchangeable.

The cover module houses the microphone, amplifier and battery source and is flexibly connected with the receiver. Both the receiver and the microphone are encased in a cushion to minimize mechanical vibration feedback. The battery source is removably housed in a pivotally mounted battery compartment. A rotational volume control mounted on the cover module and connected to the amplifier allows the user to adjust the gain of the hearing aid. The cover module is detachably interconnected with the rigid body such that a key must be engaged with the cover module and rigid body before they may be disconnected.

Additionally, the rigid body and soft, resilient covering may be provided with vent channels for allowing air to by-pass the hearing aid and circulate to the eardrum. This vent system is selectably closable at the D-shaped opening in accordance with the user's preference or the amount of feedback generated. The degree of venting may be patient selected to make use of residual hearing, particularly of low frequency sounds. And the patient selected size of the vent can provide useful modifications of performance characteristics, such as reducing unwanted low frequency noise emphasis from the hearing aid.

In an alternative embodiment, the detachable cover module is replaced with a test module to be used in the evaluation and selection of the specific electronic components to be inserted into the earshell assembly. A test receiver is inserted into the earshell assembly fitted to the user's auditory canal and is connected to the test module. The test module is umbilically connected to a test station which can simulate various combinations of the electronic components that comprise the hearing aid. By using the same earshell assembly that the user will receive, the test module allows the user to select the best set of electronic components for the hearing aid through a paired comparison process similar to that used in ophthalmology.

The principal objectives of the invention are: (a) to provide a user selected hearing aid that is mass produced and still conforms to the individual shape of a user's auditory canal; (b) to provide a hearing aid that is composed of electronic components which are user selected; (c) to provide a hearing aid that may be tested and fitted during a single visit to an audiologist or hearing aid dispenser; (d) to provide a hearing aid which minimizes mechanical vibration an acoustical feedback; and (e) to provide a hearing aid with a removable but lockable cover module. These and other advantages and obligations will become obvious to those skilled in the art upon a review of the following description of the preferred embodiment and the accompanying drawings.

DESCRIPTION OF THE PREFERRED EMBODIMENT

The ear canal (external auditory meatus) leads from the concha to the eardrum, and varies in both size and shape. The outer portion of the canal, about one-third of its length, is cartilagenous. The remaining two-thirds is bony. The canal is not straight, it is irregular in course. It takes on a somewhat S-shaped form medially. It curves first anterosuperiorly (first bend-forward and up), then posterosuperiorly (second bend-backward and up) and finally anteroinferiorly (forward and down). It is for this reason that the pinna must be pulled up and back in order for one to see the eardrum.

As would be expected from its irregular course, the length of the canal is also not uniform. Instead, it is normally over two centimeters long posterosuperiorly and normally slightly over three centimeters long inferoanteriorly. Also contributing to the greater length of the lower part of the canal is the oblique orientation of the eardrum as it sits in its annulus at the end of the canal.

Figures 1, 2:
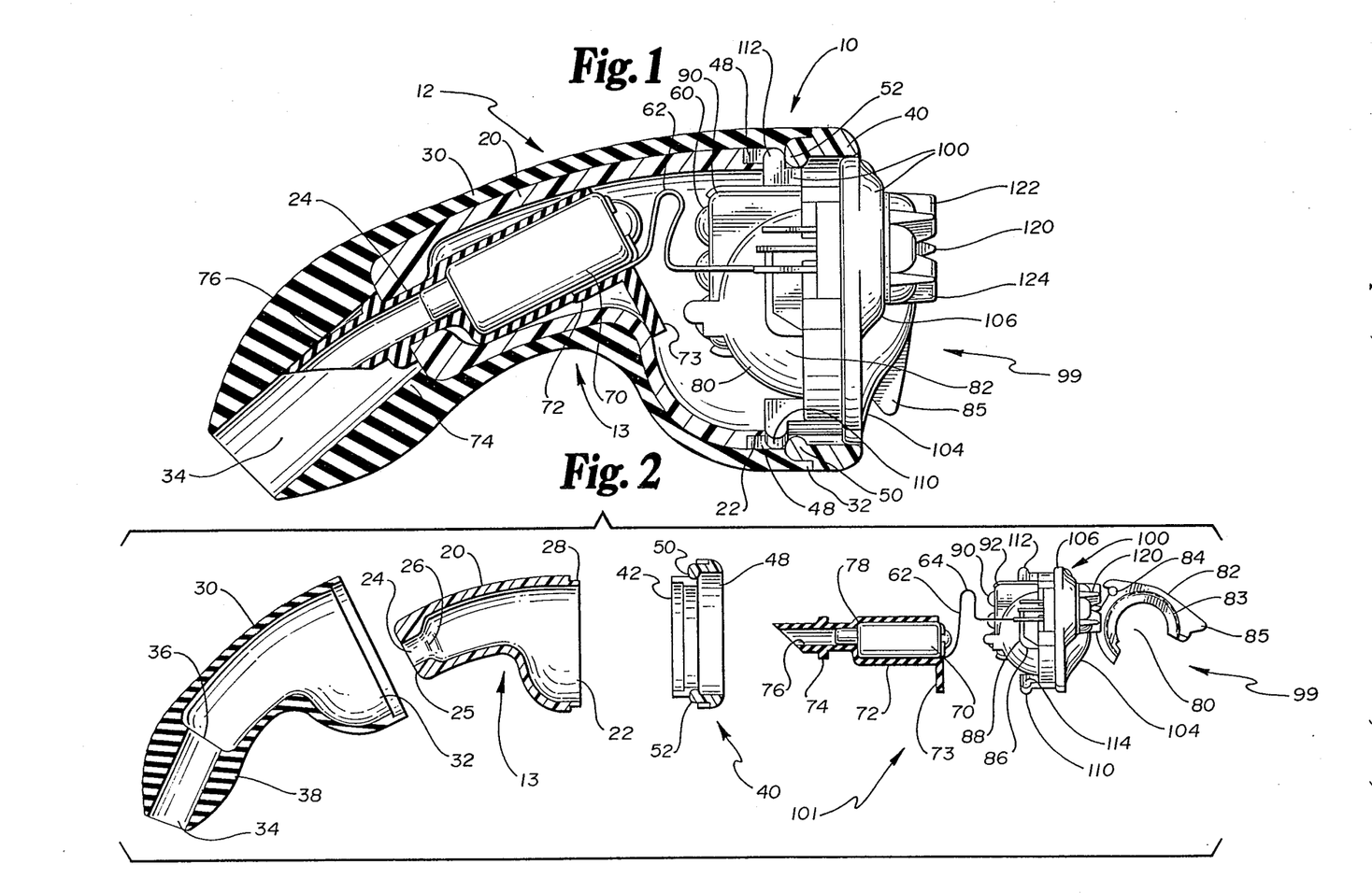
FIG. 1 a horizontal cross-sectional view of the interior of the aid according to the present invention showing components thereof.
FIG. 2 an exploded version of the horizontal cross-sectional view depicted in FIG. 1 showing the interrelation among elements.

As best seen in FIGS. 1 and 2, the preferred embodiment of the present invention includes a mass produced hearing aid 10 capable of being inserted into the external auditory canal or meatus of the ear of a user (not shown). The preferred embodiment of the invention accommodates, in unique and creative ways, the physiological attributes of the human hearing mechanisms. The hearing prosthesis 10 has been human engineered to respond to the different characteristics of different patients, creatively sculpted to respond to shape and to address interfacing between an engineered solution and the physical reality of different human ear canals. Finally, the choice as to the best solution or configuration of these factors is left to the only individual who can accurately judge and determine the best solution and configuration, the patient.

The physical characteristics of the ear are accommodated by a solid core or shell 20 which is characterized by a deeply sculpted forward and inward hook 13 to accommodate the first bend between the concha and the meatus. Therefore all but the control plate 99 for the amplification module 101 penetrates into the canal. The core 20 then penetrates the canal with an upward twist, shown in FIGS. 4 and 8, to conform to the natural anatomy of the ear. Fixedly secured to the outer surface of the core 20 is one of a plurality of soft conforming layers 30a–30e, shown in FIGS. 8A–8C. These elements, the core 20 and one of the plurality of coverings 30a–e, and a flange 40 to retain the cover 100 for the amplification module 101, constitute the patient selected earshell assembly 12. The specific choice of which layer 30 to use depends on the specific size of the patient's ear canal, the patient's comfort and the sound characteristics of the aid 10. The patient selected soft malleable layer 30 conforms to the surface, diameter and shape of the external auditory meatus and penetrates toward and perhaps to the second bend. Since the last two thirds of the canal are bony, this is where physical discomfort is most likely to occur. The soft material conforms to the surface, to seal feedback pockets, and does not force its shape on the ear canal. If penetration is too deep for some reason, the tip 38 can be easily cut or shortened by the dispenser.

Figure 6:
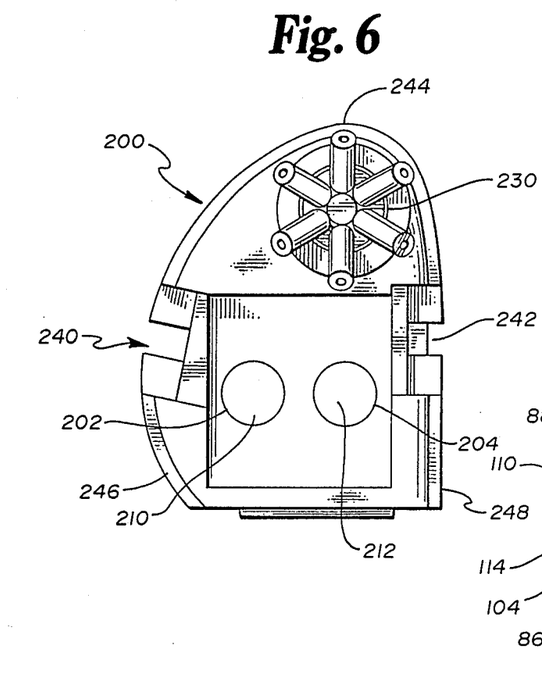
FIG. 6 is an end view of the test module as seen from outside the ear.
Figure 10:
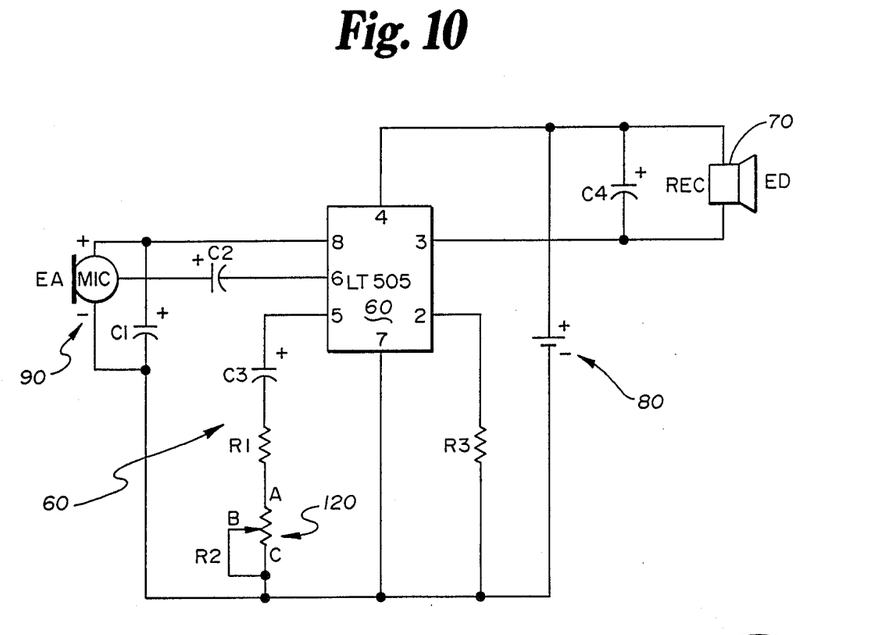
FIG. 10 is a schematic of the electronic components of the hearing aid.

Using the patient selected earshell assembly 12, a test module 200 shown in FIG. 6, is inserted which is connected to a test device using the same electronics 60 shown in FIG. 10 that will be present in the final hearing aid 10. The patient, then, using a decision tree and test procedure, chooses personally the electronic characteristics of the aid 10 which best assists the patient's hearing loss or hearing problem. The method or process of selection of the electronic components during selection of the aid 10 is more fully described is U.S. patent application Ser. No. 867,487, entitled Patient Controlled Master Hearing Aid filed contemporaneously herewith. The disclosure of that application is incorporated herein by reference and may be referred to for the method and apparatus. An amplification module 101 having these exact patient selected components 60 is then snapped into the patient selected earshell assembly 12 and the patient can leave with his or her own uniquely designed and matched hearing aid 10.

Figure 7:
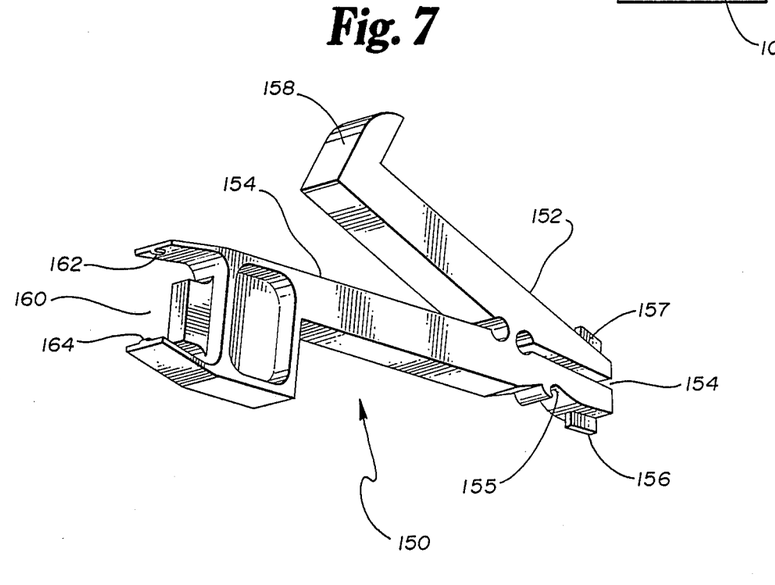
FIG. 7 a perspective view of the removal key for the cover or amplification module.

In the event that a condition is experienced which was not anticipated during the test, either physical discomfort or a sound response anomaly, either the earshell assembly 12 or the amplification module 101 having electronics 60 can be easily exchanged or replaced with the use of a simple tool 150 is shown in FIG. 7.

Figure 11:
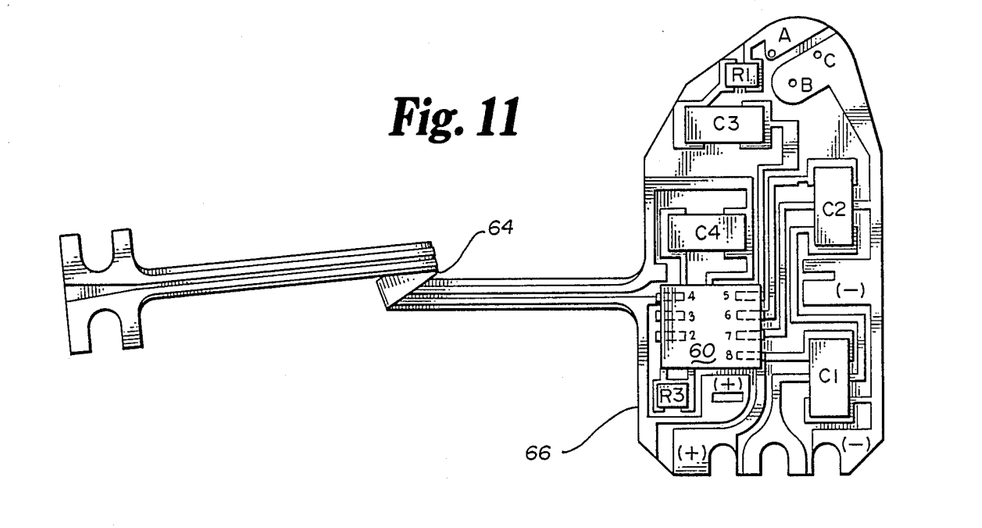
FIG. 11 is a top the flexible substrate.

The invention is achieved as follows:

The hearing aid 10 includes an earshell assembly 12 for housing the standard electronic components usually found in a hearing aid: microphone 90, amplifier 60, receiver 70 and battery source 80. A pseudo random frequency noise generator is used as a sound source 90 if the hearing impediment is tinnitus, a "ringing" or "buzzing" in the head. The electronics 60 are mounted in and to an amplification module 101 which consists of a cover 100, the electronic components 60, including a flexible substrate 66 upon which certain of the components are surface mounted, including the amplifier 60, capacitors C1–C4, resistors R1 and R3, and which extends to the microphone 90, all of which are shown in FIGS. 1, 2 and 11 and schematically in FIG. 10. The amplification module 101 is detachably connected to the earshell assembly 12 as will be described in more detail below.

Earshell assembly 12 is inserted into the auditory canal of a user's ear with receiver 70 oriented toward the eardrum and microphone 90 oriented toward the patient's environment. In position, hearing aid 10 rests within the auditory canal of the user with the opening of the concha bowl of the user's ear filled by that portion of earshell assembly 12 which faces the environment.

As seen in the drawings, earshell assembly 12 is formed from a hollow rigid core 20, a soft, resilient covering 30 affixed to the exterior of the rigid core 20, and a rigid flange 40 attached to the environmental end 22 of the rigid core 20. Earshell assembly 12 is also provided with openings 24, 34 in the core 20 and covering 30 respectively to the eardrum. The environmental ends of the core 20 and covering 30 have corresponding openings 22 and 32 respectively. Cover 100 is detachably interconnected with flange 40 such that it substantially closes opening 22 to the environment. The elements forming earshell assembly 12 are prefabricated in a shape and manner to be fully described hereinafter.

Figures 12A, 12B:
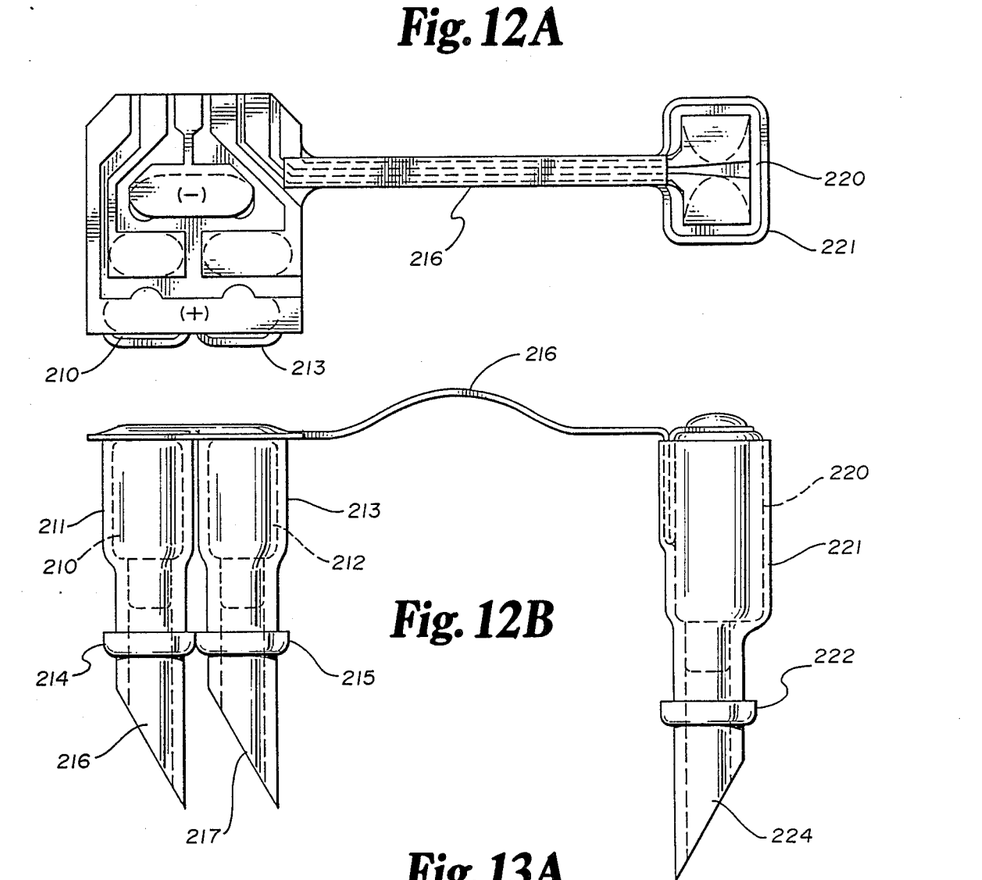
FIGS. 12A and 12B are top and side views of the flexible test module substrate, microphones and receiver.

Earshell assembly 12 houses all of the electronic components of hearing aid 10 Microphone 90 is connected as part of amplification module 101 with the sound receiving portion of microphone 90 protruding through aperture 102 of cover module 100. The portion of microphone 90 housed in cover module 100 is encased in a cushion 92 (such as the cushions 211, 213 and 221 shown in FIG. 12) to minimize mechanical vibration feedback picked up by microphone 90. Amplifier 60 on flexible substrate 66 is electrically connected to microphone 90 and battery 80. Flexible connection 62 carries the amplified signals to receiver 70 with loop portion 64 providing strain relief between cover module 100 and receiver 70.

Like microphone 90, receiver 70 is encased in a cushion 72 to minimize mechanical vibration feedback. Cushion 72 is provided with an extraction tab 73 and an annular flange 74 allowing tubular segment 76 to be extended through opening 24 of rigid core 20. Cushion 72 and receiver 70 are thereby secured in earshell assembly 12 in a grommet-like fashion and can easily be removed, if necessary, with use of the extraction tab 73.

Figure 9:
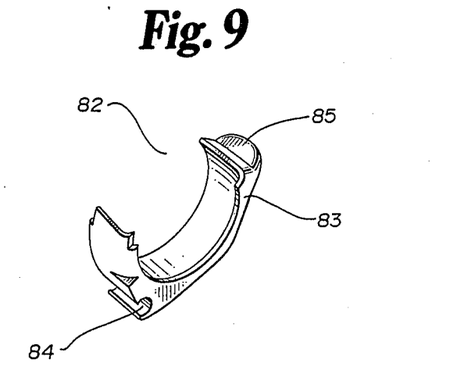
FIG. 9 is a perspective view of the removable battery compartment.

Battery source 80 is removably housed in the cover 100 by battery compartment 82, shown in FIG. 9. Battery compartment 82 is also removable and is pivotally mounted in cover module 100 on pivot pin 108 and extends through aperture 104 of cover 100 in a manner to be fully described hereinafter. Volume control 120 is rotationally housed in cover 100 and extends through aperture 106. Volume control 120 is electrically connected with amplifier 60 and includes raised flanges 122 and 124 for aiding in its rotational operation by the user.

FIG. 2 shows an exploded view of earshell assembly 12 and the interrelation among the various elements thereof. Beginning on the left of FIG. 2, it can be seen that annular seating surface 36 of covering 30 will abut inner surface 25 of rigid core 20 to prevent core 20 from passing through inner opening 34 of covering 30. In a similar fashion, neck 78 of cushion 72 is prevented by annular seating surface 26 from passing through inner opening 24 of rigid core 20. Annular flange 28 of rigid core 20 mates with annular groove 42 to seal the periphery of opening 22 when flange 40 is connected with rigid core 20. On the outer side of flange 40, bottom annular ridge segment 48 abuts collar 106 when cover module 100 is detachably interconnected with flange 40. Annular ridge segments 50 and 52 (shown in FIG.

4B) also abut collar 106. During prefabrication, soft, resilient covering 30 is fixedly attached to the exterior of rigid core 20 and flange 40 is fixedly attached to opening 22 of rigid core 20. Since the outer periphery of the inner edge of flange 40 overhangs the sleeve 30, it protects the edge of the sleeve 30 from peeling off the core 20 when the amplification module 101 is snapped onto the earshell assembly 12.

Tubular segment 38 surrounding opening 34 allows tip 38 of the aid to be extended further into the ear canal of the user. This is desirable since the closer the orifice of tubular segment 38 is to the eardrum, the greater the effective sound output of hearing aid 10. Roughly, as the distance between the receiver and the surface of the eardrum is halved, the effective sound pressure of the hearing aid is doubled (i.e., increased by 6 dB gain). Conventional in-the-canal hearing aids penetrate only ¼ to ⅜ of the length of the auditory canal. Further penetration by prior art devices is prohibited by the pain associated with a hard object being inserted into the auditory canal. Since covering 30, including all of tubular segment 38, is made of a soft, resilient material, tubular segment 38 may penetrate up to ¾ of the length of the auditory canal, thereby increasing the effective gain of hearing aid 10 by upward of 6 to 10 dB over conventional in-the-canal hearing aids. This gain is accomplished without requiring any corresponding increase in the power consumed by the device.

Figure 4A:
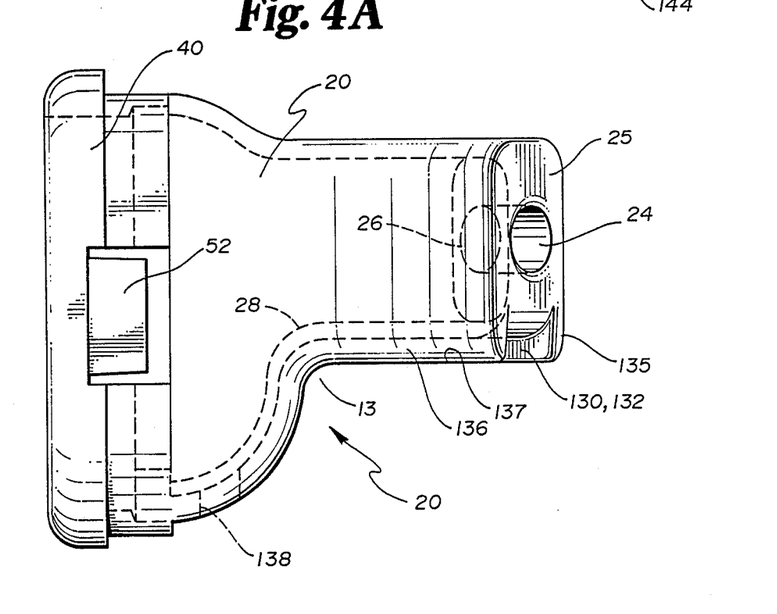
FIG. 4A is a side view of the rigid core and flange for the left/auditory canal.
Figure 4B:
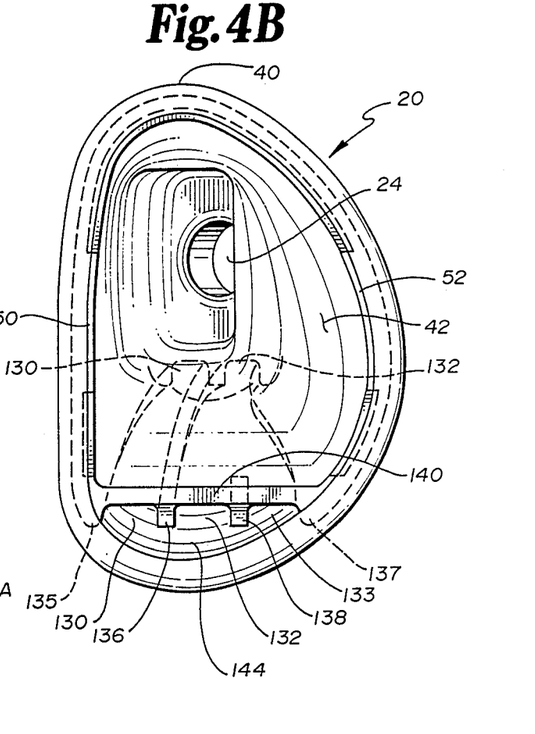
FIG. 4B is a front view of the rigid core and flange for the left auditory canal.
Figure 5:
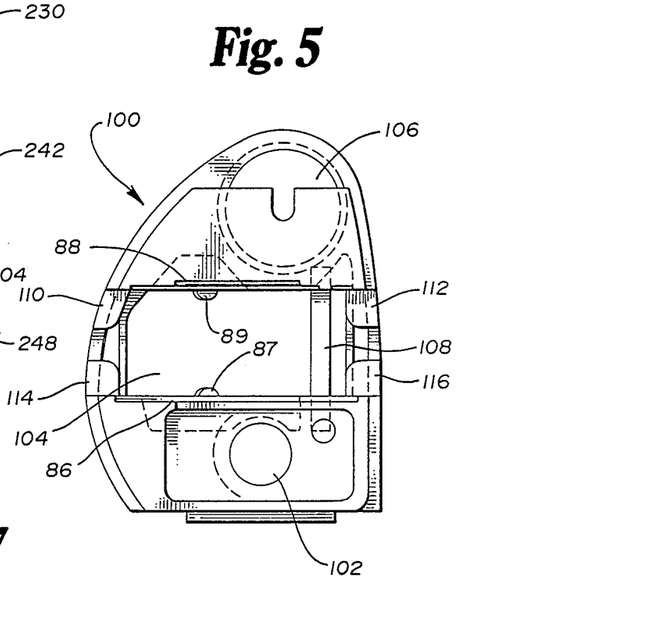
FIG. 5 is an end view of the cover module, without microphone, battery compartment or volume control.

The elements involved in detachably interconnecting amplification module 101 with flange 40 are shown in FIGS. 2, 4 and 5. When cover 100 is aligned and brought into contact with flange 40, the four bayonet tabs 110, 112, 114 and 116 on the inner side of the cover 100 align with and slide along the inner surface of retention tabs 50 and 52 on the periphery of flange 40. The bulbous ends of bayonet tabs 110, 112, 114 and 116 cooperate with the raised portions of retention tabs 50 and 52 to prevent the disconnection of cover module 100 unless removal key 150 is used in a manner as described hereinafter. As bayonet tabs 110, 112, 114 and 116 are slid along the ridges 50, 52 they press outwardly against ridges 50 and 52. Since tabs 110, 112, 114 and 116, flange 40 and integrally molded ridges 50 and 52 are made of a rigidly resilient material, like plastic, the tabs deform inwardly and/or the ridges deform outwardly to allow cover module 100 to be inserted into flange 40. Once the bulbous portion of bayonet tabs 110, 112, 114 and 116 are driven inward past the raised portion of ridges 50 and 52, the ridges 50, 52, and tabs 110, 112, 114 and 116, return to their original position and lock cover module 100 to flange 40, thereby preventing cover module 100 from being outwardly removed due to the pressure of the ridges 50, 52 on the ends of the bayonet tabs.

As shown in FIG. 5 and FIG. 9, battery compartment 82 for battery source 80 is pivotally mounted on pivot pin 108 at pivot channel 84 such that it may be horizontally swung through aperture 104 until the positive and negative contact surfaces on battery source 80 fully engage positive contact 86 and negative contact 88 in cover module 100. Positive contact 86 and negative contact 88 are metallic plates with rounded contact points 87 and 89 respectively. The contact plates 86 and 88 are integrally molded into the plastic body of the cover 100 with the rear portion of the plate extending outward from cover module 100. This allows contact plates 86 and 88 to slightly depress respectively downward and upward against the positive and negative contact surfaces of battery source 80 as it is slid across contact points 87 and 89. The pressure exerted by contact plates 86 and 88 and contact points 87 and 89 frictionally secures battery source 80 in cover module 100, providing good electrical connection with the positive and negative contact surfaces of battery source 80. The battery compartment is restrained by a snap mechanism. The snap mechanism prevents battery compartment 82 from swinging out from cover module 100 until battery compartment tab 85 is used to pivotally swing battery compartment 82 out through aperture 104. Once fully swung out from aperture 104, battery compartment 82 may be disconnected from cover module 100 by unsnapping pivot channel 84 from pivot pin 108 thereby removing battery compartment 82 from opening aperture 104. Battery source 80 is prevented from falling out of battery compartment 82 by lower annular lip 83.

A schematic of the electronic components 60 used in the amplification module 101 is shown in FIG. 10. The parameter values for the sound source 90, one of two microphones 210 or 212 shown in FIG. 12 or a tinnitus random noise source, the input coupling capacitor C2, the gain resistor R1 and the maximum sound output resistor R3 are patient selected using the test module shown in FIGS. 6 and 12. A variable resistor R2, the receiver 70, amplifier 60, battery source 80 and bypass capacitors C1 and C4 are standard components used in the aid 10. These electronic components 60 are connected to or surface mounted on a flexible substrate 66 as shown in FIG. 11. The flexible substrate 66 is made of a polyamide material, like Kapton. The space occupied by the electronic components 60 is minimized when substrate 66 is flexibly inserted into cover module 100. Also, flexible connection 62 connects amplifier 60 and receiver 70, providing a connection that vibrationally isolates amplifier 60 from receiver 70. The extraction tab 73 serves the purpose of providing a means for removing receiver 70 from opening 24 where it is secured in a grommet-like fashion.

The cover 100 is detachably disconnected from flange 40 by inserting removal key 150, as shown in FIG. 7, into aperture 104. Removal key 150 is provided with two independent key means, lever end 152 and shovel end 160. Lever end 152 is inserted into aperture 104 by hooking notch 155 onto the middle of pivot pin 108 so that prong 156 is positioned between bayonet tabs 112 and 116. Lever end 152 is then pivoted about notch 155 so that prong 157 is similarly positioned between bayonet tabs 110 and 114. Lever end 152 is pushed into rigid core 20 and prongs 156 and 157 are expanded outward by the operator of the removal key squeezing together levers 158 and 159 in a clothes-pin-like fashion. Prongs 156 and 157 press outwardly against ridges 50 and 52, thereby allowing the bulbous portions of bayonet tabs 110, 112, 114 and 116 to pass over the lip portion of ridges 46, 48, 50 and 52. Cover module 100 is now free to be disconnected by pulling outwardly on cover module 100. Once cover module 100 has been detached, receiver 70 is released by a slight tug on extraction tab 73 on cushion 72 to disengage the grommet-like connection of annular flange 74. All of the electronic components may then be removed easily from earshell assembly 12.

Earshell assembly 12 is also preferably provided with vent channels 130, 132 and 133. The vent channels allow air to bypass the amplifying portion of hearing aid 10 and circulate to the eardrum. The use of appropriate vent inserts 134a-134e minimize the accoustical feedback experienced by the user. The vents 130, 132, 133 as restricted by the inserts 134 prevent the discomfort and feeling of fullness usually associated with the insertion of the object into the auditory canal. While it is seen in the preferred embodiment that vent channels are formed by the combination of rigid core 20 and resilient covering 30, it is also possible to form the vent channels by other methods, such as providing channels internal to rigid body 20 or providing a passage completely within resilient covering 30.

As best shown in FIGS. 4A and 4B and FIGS. 8A and 8B, U-shaped vent channels 130 and 132 are formed in the valleys created by center strut 136 and side struts 135 and 137 located on the inferior side of rigid core 20. Side struts 135 and 137 are approximately the same height as center strut 136. Near opening 22 rigid core 20 is also provided with a second center strut 138 of a similar height as center strut 136, to assist in forming vent channels 130, 132, and 133 on that portion of the inferior side of rigid core 20 which broadens toward the outer ear. When resilient covering 30 is affixed to the exterior of rigid core 20, it can be seen in FIGS. 8A and 8B that vent channels 130 and 132 are created beginning at the opening to the inner ear and extending along the inferior side of earshell assembly 12 to vent channel openings 130, 132, and 133 to the environment.

Figures 13A, 13B:
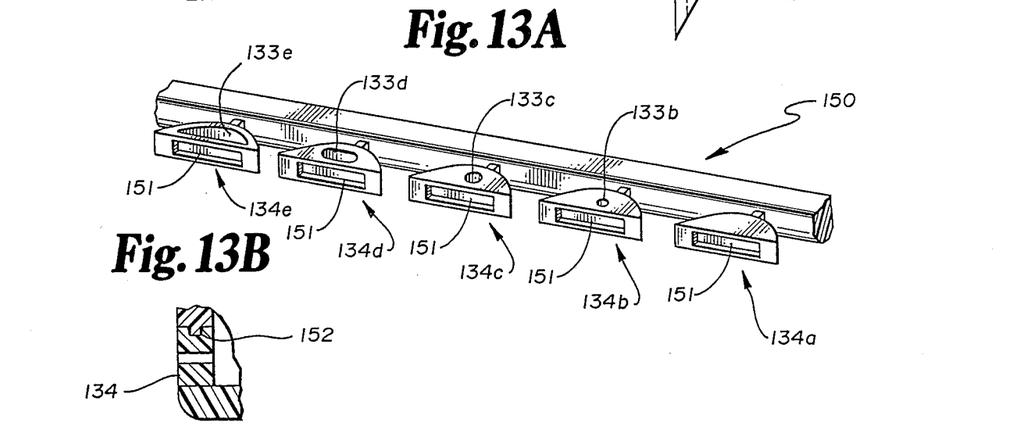
FIG. 13A is a pictorial view of a representative variety of the variable plastic vents attached to a bar by break-off connections that can be used with the invention to control the amount of venting and consequent acoustic response of the aid.
FIG. 13B a cross-sectional detail though part of the earshell assembly and part of the vent piece to illustrate the way it is retained.

Vent channels 130, 132, and 133 may also be selectably closeable at the bottom of opening 22 to the environment with the use of vent inserts 134a-134e. The vent inserts 134a-134e are preferably available to the dispenser on a vent tree 150 to provide a range of venting from no vent using insert 134a to full open using no vent insert 134, although maximum venting is preferably achieved with the largest apertured 133e vent insert 134e. Each of vent inserts 134b-134e have successively larger apertures 133b-133e to accommodate the user's preference. The amount of opening 133 left in the vent channel is selected in accordance with the user's preference as to sound quality and minimization of acoustic feedback. Sideways D-shaped opening 144 at the bottom of opening 22 is formed by the combination of bottom cross member 140 and bottom annular ridge 48. Opening 144 may be fitted with any of the various sized vent closures 134 as shown in FIG. 13B. Vent closures 134 are selected and pressably inserted into opening 144 until the vent closure abuts the outer edges of center struts 136 and 138 and are retained by a snap interlock 152 in aperture 151 in the top of the vent inserts 134.

In an alternative embodiment of the invention, cover module 100 is replaced by test module 200 as shown in FIG. 6. Test module 200 includes test microphones 210 and 212 and umbilical connection 230. As shown in FIG. 12, test microphones 210 and 212 are electrically connected to test receiver 220 by flexible connection 216 which serves as a strain relief strap. Like microphone 90 and receiver 70, test microphones 210 and 212 and test receiver 220 are encased respectively in resilient cushions 211, 213, and 221. Test receiver cushion 221 is provided with annular flange 222 and elongated tubular segment 224 for inserting test receiver 220 and cushion 221 into inner opening 24 and 34 in a grommet-like manner. Test microphone cushions 211 and 213 are also provided with annular flanges 214 and 215 and tubular segments 216 and 217. When cushions 211 and 213 are inserted into apertures 202 and 204 of test module 200, tubular segments 216 and 217 extend through apertures 202 and 204 with cushions 211 and 213 and test microphones 210 and 212 thereby secured in a grommet-like manner.

Like cover module 100, test module 200 is also detachably interconnected with rigid core 20 and flange 40. In the preferred embodiment, because of the location of test microphones 210 and 212, removal key 150 may not be used in a manner similar to the unlocking of cover module 100. Therefore, shovel end 160 is provided on removal key 150 with prongs 162 and 164 to be inserted into slots 240 and 242 of test module 200. Unlike cover module 100, the collar segments abutting annular ridge segments 50, and 52 are split into three collar segments 244, 246, and 248. Slots 240 and 242 are created by the spaces between collar segments 244 and 246 and collar segments 244 and 248. When shovel end 160 of removal key 150 is inserted into slots 240 and 242, prongs 162 and 164 press outwardly against ridges 50 and 52. Since flange 40 and integrally molded ridges 50 and 52 are made of a rigidly resilient material, like plastic, the ridges deform outwardly to allow test module 200 to be removed from flange 40.

Umbilical connection 230 provides electrical connection between test receiver 220, test microphone 210, 212, and the external test device (not shown, but described in co-pending Application Ser. No. 867,487), now U.S. Pat. No. 4,759,070 which is used to simulate the various combinations of electronic components to be inserted into hearing aid 10. Umbilical connection 230 is moldably secured in test module 200 and is formed of a flexible material.

One of the objectives of the invention is to provide a hearing aid that is mass produced, but still generally conforms to the individual shape of each user's auditory canal. The invention discloses several inventive features for accomplishing this objective. As previously described, the soft, resilient covering 30 that is affixed is the exterior of rigid core 20 allows the cylindrical or elliptical shape of the in-the-canal aid to more easily conform to the individual variations in a user's auditory canal. Other inventive features which assist in accomplishing this objective are disclosed in the results of independent research into the average shape of and commonalities among human auditory canals. The results of this research are summarized and shown in FIG. 3. The engineered result of FIG. 3 was then further refined by creative sculpting and empirical testing to produce hook 13 for the shell and the variations in dimension for the sleeve 30a-30e shown in in FIGS. 8A-8C. The dimensional values are set forth in those figures are believed to accommodate approximately 95 percent of the population to provide a comfortable fit within the canal and a sealing interface between the skin and the sleeve 30.

Figure 3:
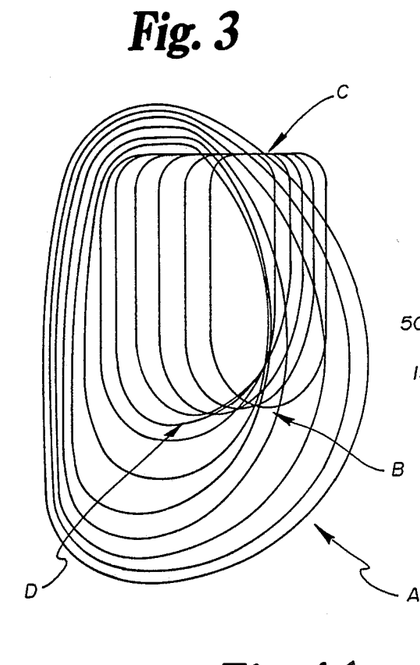
FIG. 3 is a topographical end view of the cross sectional profiles at regular intervals in depth of field, illustrating a computer generated contour identifying design criteria related to the rigid core assembly based on anatomical and engineering input to accommodate the average human auditory canal.
Figure 8A:
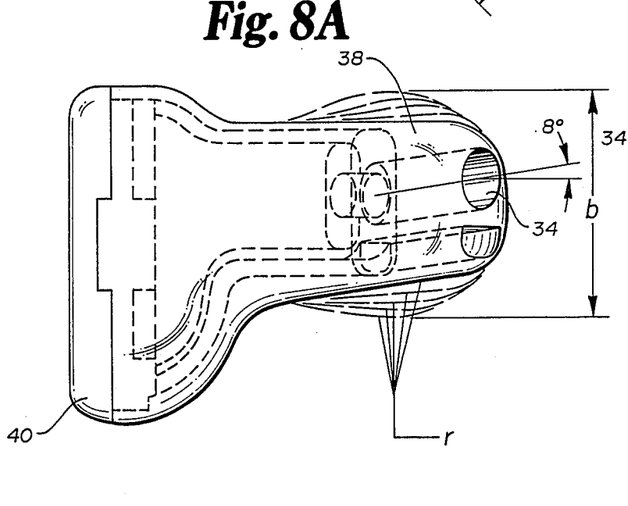
FIGS. 8A, 8B and 8C are top, side and interior end elevational views, respectively, of the left earshell assembly depicting various shapes and thicknesses of the flexible covering.
Figure 8B:
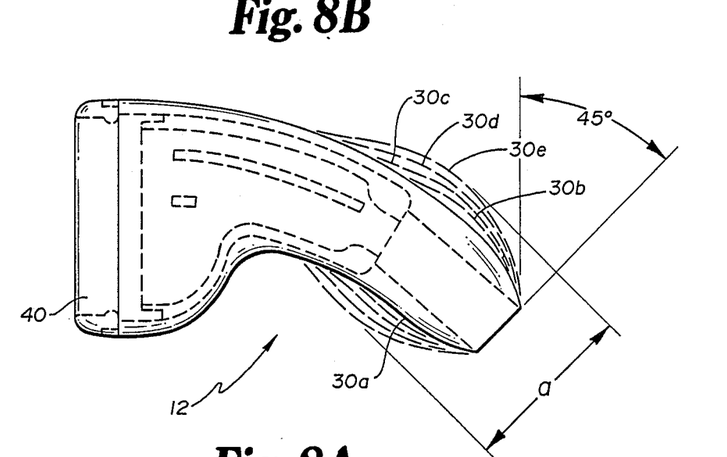
Figure 8C:
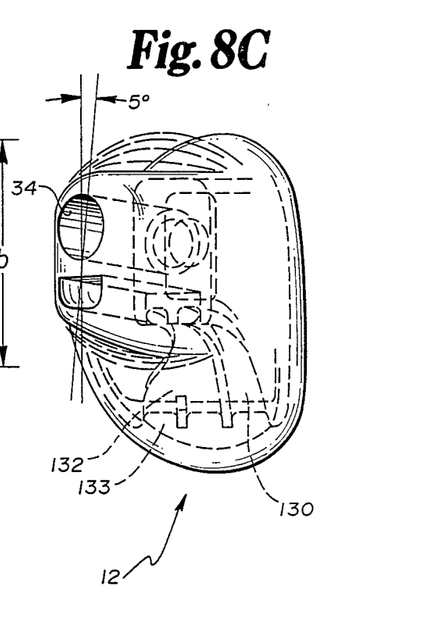

The inventive features disclosed in FIGS. 3, 4 and 8 and by this invention are not taught by the prior art. While custom molded in-the-canal hearing aids known in the prior art convey some of the same information as found in FIG. 3, they do not teach a least common norm for the shape of an in-the-canal hearing aid. Nor does this prior art suggest a range of variations about such a norm. The prior art for stock canal aids and for receiver tips encased in soft, resilient coverings teaches that auditory canals conform to a cylindrical shape or to an elliptical shape. A rectangular shape for a resilient covering is disclosed by U.S. Pat. No. 3,527,901. A circular tubular shape for a resilient ear tube sleeve with a single rearward bend is disclosed by U.S. Pat. No. 4,375,016. An elliptical shape, is disclosed by U.S. Pat. No.

3,783,201, is in the form of a super-elipse defined by the equation $(x/a)^n+(y/b)^n=1$, wherein $n=2.4$. None of these shapes teach the inventive features disclosed by this invention.

The inventive features taught by the research summarized by FIG. 3 and modified by the designs disclosed in this invention are: The D-shaped opening of the auditory canal to the outer ear oriented with the curved portion toward the back of the ear (shown at A); The U-shaped opening to the inner ear oriented with the curved portion to the bottom of the ear (shown at B); The tapered portion having a forward and inward hook and an upward twist (shown at C and D); The combination of the above features such that earshell assembly 12 is unique and non-interchangeable for the right and left auditory canals of a user; and the plurality of shapes and thicknesses of covering 30 designed to accommodate specific ranges of variations from the least common norm as shown in FIGS. 8A, 8B and 8C.

Although in the following preferred structure and operation of the invention all of the inventive features are used in combination, it will be observed that the inventive features may be used individually or in any combination to achieve the objective of the invention of providing a better fitting mass produced hearing aid.

Referring now to FIGS. 4A and 4B it can be seen how these inventive features are incorporated in the mass production hearing aid as described above. FIGS. 4A and 4B show the rigid core 20 and flange 40 for the left auditory canal of a user. The D-shaped opening to the outer ear is shown at 42. The U-shaped surface facing the eardrum is shown facing the viewer at 135. It is observed that the inverted U-shaped vent channels 130 and 132 combine with the interior of the auditory canal near the eardrum to form a seal having a U-shaped outline which conforms to interior shape of the ear canal. The forward and inward hook one upward twist are apparent in many of the Figures, such as FIGS. 1, 2, 3, 4 and 8. As indicated in FIG. 8 the forward and inward hook is approximately 45° (FIG. 8B) with an upward twist of approximately 8° from horizontal (FIG. 8A). The resulting nominal twist from vertical is approximately 5° (FIG. 8c). It will be understood, however, that due to the resilient nature of the soft sleeve 30 that these angular displacements may and will vary to assume the natural hook, twist and tilt naturally occurring in the patient's own ear canal. The plurality of shapes and thicknesses of the resilient covering 30 are best shown in FIGS. 8A, 8B and 8C. The resulting tip sizes become ovoid in shape with the following dimensional variations.

| CANAL SLEEVE TIP SIZES | | | |
| --- | --- | --- | --- |
| SLEEVE | SIZE | a × b (+.015) | r |
| 30a | 1 | 230 × 330 | .100r |
| 30b | 2 | 260 × 360 | .150r |
| 30c | 3 | 290 × 390 | .200r |
| 30d | 4 | 320 × 420 | .250r |
| 30e | 5 | 350 × 450 | .300r |

The resulting core 12 design with a substantial hook 13 permits the aid 10 to be inserted deeply within the concha and the core shape is conducive to the upward and inward course of the ear. The soft materials of the sleeve 30 adhere to the skin better than plastic surfaces used in the past and a good acoustic seal has been achieved for all sizes of the aid 10. The malleable and flexible material of the sleeve also conforms to the contours of each patient's ear to enable deep penetration and better performance without pain or discomfort.

The unique shape and combination of the inventive features of this invention are necessary because the in-the-canal hearing aid 10, disclosed by this invention extends further into the auditory canal than other in-the-canal aids known in the prior art Previous in-the-canal aids did not reach or extend beyond the second bend that is present in the auditory canal. This second bend requires that a hearing aid inserted to this point have a flexible canal tip to accommodate the second bend. While the forward hook of the first bend in the auditory canal is taught by the prior art, none of the prior art teaches how to form an in-the-canal hearing aid which can accommodate to the second bend in the auditory canal.

It will be obvious to one skilled in the art that a number of modifications can be made to the specific embodiments described herein without essentially changing the invention. The amplification module and test module may be detachably interconnected with the rigid core by means other than the bayonet tabs shown, and the battery compartment and replaceable battery source may be implemented in a number of different ways. Accordingly, while the preferred embodiment of the invention has been described and illustrated, it is understood that the invention is not limited to the precise construction herein disclosed, and the right is reserved to all changes and modifications coming within the scope of the invention as defined in the appended claims.

Having thus defined our invention, we claim:

1. An auditory canal hearing aid to be wholly inserted within the external ear of a user which is prefabricated from modular elements which are mass produced prior to fitting the user with a hearing aid, the hearing aid comprising:

a preassembled amplification module comprising:
  a cover module having at least one aperture therein;
  a sound source located within the aperture of the cover module;
  amplifying means for amplifying the sound from the sound source;
  a receiver for reproducing the sound amplified by the amplifier;
  a battery source for supplying power to the amplifier; and
  means for interconnecting said sound source, said amplifier, said battery and said receiver means; a prefabricated earshell assembly comprising:
  a precast and preshaped hollow thin shelled rigid core having at least one opening to the environment and at least one opening to the eardrum and having an external shape which conforms to the natural anatomy of the ear; and
  a premolded soft, resilient, malleable covering fixed to the exterior of said rigid core having a tip which extends beyond the eardrum end of the rigid core, the tip having an ovoid shape and being of sufficient length for deep penetration of the ear canal so that the tip extends past the first bend in the ear canal and penetrates the ear canal to a depth of three eights to three quaters of the depth of the ear canal; and means for detachably connecting the amplification module to the prefabricated earshell assembly.

2. The invention as recited in claim 1 wherein said rigid core includes interlocking means located adjacent said opening to the environment.

3. The invention as recited in claim 2 wherein said opening in the rigid core to the environment has a predetermined cross-section and wherein said cover module comprises:
a cover having a cross-section corresponding to the cross-section of said opening in the rigid core to the environment; and
interlocking means located about the periphery of said cover such that said interlocking means of said cover to detachably interconnect said rigid core with said cover module.

4. The invention as recited in claim 3 wherein said cover module further includes battery retaining means for replaceably housing said battery source.

5. The invention as recited in claim 3 wherein said sound means is a microphone and wherein said cover module further includes microphone retaining means for housing said microphone means.

6. The invention as recited in claim 1 wherein said hollow rigid core comprises an expanded portion opening to said environment and, a tapered portion, extending toward the user's eardrum.

7. The invention as recited in claim 6 wherein said tapered portion of said rigid core has a forward and inward hook and an upward twist.

8. The invention as recited in claim 1 wherein said soft, resilient covering comprises a hollow shell having at least one opening to the environment, a tapered portion, and at least one opening to the eardrum.

9. The invention as recited in claim 8 wherein said opening to the environment of said hollow shell is generally D-shaped.

10. The invention as recited in claim 8 wherein said tapered portion of said hollow shell has a forward and inward hook and an upward twist.

11. The invention as recited in claim 8 wherein said hollow shell for a particular patient is selected from one of a plurality of hollow shells having varying thicknesses and shapes.

12. The invention as recited in claim 1 wherein said rigid core further includes vent means incorporated in the structure of said rigid core for allowing air to circulate from the environment to the eardrum.

13. The invention as recited in claim 12 wherein said vent means includes strut segments on the inferior side of said rigid core whereby said strut segments cooperate with said resilient covering to form a channel from the eardrum to the patient's environment.

14. The invention as recited in claim 14 wherein said vent means is selectably closeable at said opening to the outer ear in accordance with user preference.

15. The hearing aid of claim 12 wherein said vent means comprises a selectable one of a plurality of vent inserts, said vent inserts being interposed in the rigid core to restrict the flow of air therethrough, and each of the vent inserts having different apertures therein.

16. The invention as recited in claim 4 wherein said battery retaining means include a metallic negative contact plate, a metallic positive contact plate, and a metal pivot pin such that said negative contact said positive contact and said pivot pin are molded integrally with said cover module.

17. The invention as recited in claim 5 wherein said microphone retaining means includes a soft, flexible cushion disposed between said microphone and said cover module.

18. The invention as recited in claim 1 wherein said amplifying means includes an amplifier and a flexible substrate material upon which said amplifier is mounted.

19. The invention as recited in claim 1 wherein said receiver means is encased in a removeable soft, resilient cushion.

20. The invention as recited in claim 19 wherein said receiver cushion is composed of two generally tubular segments, the first tubular segment housing the receiver means, and a second smaller diameter tubular segment extending from the sound emitting aperture of said receiver means for carrying the amplified sound to the user's eardrum.

21. The invention as recited in claim 19 wherein said receiver cushion further includes an annular grommet flange circumscribing the exterior of said receiver cushion such that said receiver means and said receiver cushion may be detachably secured in said rigid body by said annular grommet flange.

22. The hearing aid of claim 1 wherein the sound source comprises a pseudo-random noise generator for masking tinnitus.

23. The hearing aid of claim 1 wherein said rigid core further includes vent means incorporated in the structure of said rigid core, said vent means comprising a selectable one of a plurality of vent inserts, said vent inserts being interposed in the rigid core to vary the accoustical response of the vent means and each of said plurality of vent inserts having a different aperture therein.

24. An auditory canal hearing aid to be wholly inserted within the external ear of a user which is prefabricated from modular elements which are mass produced prior to fitting the user with a hearing aid, the hearing aid comprising:
a preassembled amplification module comprising:
a cover module having at least one aperture therein;
a sound source located within the aperture of the cover module;
amplifying means for amplifying the sound from the sound source;
a receiver for reproducing the sound amplified by the amplifier;
a battery source for supplying power to the amplifier; and
means for interconnecting said sound source, said amplifier, said battery and said receiver means; and
a precast and preshaped hollow thin shelled rigid core having an expanded portion with a generally D-shaped opening to the environment and a tapered portion with at least one opening to the eardrum and having an external shape which conforms to the natural anatomy of the ear; and
a premolded soft resilient covering fixed to the exterior of said rigid core; and means for detachably connecting the amplification module to the prefabricated earshell assembly.

25. The invention as recited in claim 24 wherein said means for detachably connecting the amplification module comprises a generally D-shaped annular flange attached to the periphery of said opening to the environment of said rigid core.

26. An auditory canal hearing aid to be wholly inserted within the external ear of a user which is prefabricated from modular elements which are mass produced prior to fitting the user with a hearing aid, the hearing aid comprising:
  a preassembled amplification module comprising:
    a cover module having at least one aperture therein;
    a sound source located within the aperture of the cover module;
    amplifying means for amplifying the sound from the sound source;
    a receiver for reproducing the sound amplified by the amplifier;
    a battery source for supplying power to the amplifier; and
    means for interconnecting said sound source, said amplifier, said battery and said receiver means; and a prefabricated earshell assembly comprising:
    a precast and preshaped hollow thin shelled rigid core having at least one opening to the eardrum and having an external shape which conforms to the natural anatomy of the ear and wherein said rigid core includes a surface facing the eardrum having said opening to the eardrum therein, said surface having a generally U-shaped outline with the curved portion of said outline oriented downwardly;
    a premolded soft resilient covering fixed to the exterior of said rigid core; and means for detachably connecting the amplification module to the prefabricated earshell assembly.

27. An auditory canal hearing aid to be wholly inserted within the external ear of a user which is prefabricated from modular elements which are mass produced prior to fitting the user with a hearing aid, the hearing aid comprising:
  a preassembled amplification module comprising:
    a cover module having at least one aperture therein;
    a sound source located within the aperture of the cover module;
    amplifying means for amplifying the sound from the sound source;
    a receiver for reproducing the sound amplified by the amplifier;
    a battery source for supplying power to the amplifier; and
    means for interconnecting said sound source, said amplifier, said battery and said receiver means; and
  a prefabricated earshell assembly comprising:
    a precast and preshaped hollow thin shelled rigid core having at least one opening to the environment and at least one opening to the eardrum and having an external shape which conforms to the natural anatomy of the ear;
    a premolded soft resilient covering fixed to the exterior of said rigid core; and
    wherein said rigid core further includes vent means incorporated in the structure of said core for allowing air to circular from the environment to the eardrum including four strut segments on said inferior side of said rigid core whereby said strut segments cooperate with said resilient covering to form a channel from the eardrum to the patient's environment, said strut segments integrally molded to said exterior of said inferior side of said rigid core, said inferior side having anterior and posterior edges, including:
      a single center strut running along the length of the pine of said inferior side of said rigid core;
      an anterior side strut the same height as said center strut running along the length of the anterior edge of said inferior side of said rigid core;
      a posterior side strut of the same height as said center strut running along the length of the posterior edge of said inferior side of said rigid core; and
      a second strut of the same height as said center strut extending a portion of the length of said inferior side from an intermediate location to the end of the core having said environmental opening and equidistantly spaced between said center strut and said posterior strut and running parallel to both;
    whereby said struts form two U-shaped channels on said inferior side at the eardrum end of said rigid core and form three U-shaped channels on said inferior side at the environmental end of said rigid core such that said channels cooperate with said flexible covering to form a passage from said opening to the eardrum to said opening to the environment allowing air to circular therebetween; and
  means for detachably connecting the amplification module to the prefabricated earshell assembly.

28. An auditory canal hearing aid test device to be inserted in the auditory canal of a user comprising:
  a hearing aid shell assembly which is prefabricated from module elements which are mass produced prior to fitting the user with a hearing aid, the hearing aid assembly comprising:
    a preshaped and precast hollow rigid core having an opening to the environment and at least one opening to the user's eardrum;
    a premolded soft, resilient, malleable covering fixed to the exterior of said rigid core having a tip which extends beyond the eardrum end of the rigid core, the tip having an ovoid shape and being of sufficient length for deep penetration of the ear canal so that the tip extends past the first bend in the ear canal and penetrates the ear canal to a depth of three eighths to three quarters of the depth of the ear canal; and
    cover means for closing said opening to the environment;
  receiver means located within said ear shell assembly; and
  means for electrically interconnecting said receiver means to an external test device.

29. The invention as recited in claim 28 wherein said rigid core includes interlocking means located adjacent said opening to the outer ear.

30. The invention as recited in claim 28 wherein said opening to the environment in said hollow rigid core has a predetermined cross-section and wherein said cover means includes:
  a test module having a cross-section corresponding to the cross-section of said opening to the environment; and
  interlocking means located about the periphery of said test module such that said interlocking means of said rigid core cooperate with said interlocking means of said test module to detachably interconnect said test module to said rigid core.

31. The invention as recited in claim 30 wherein said test module further comprises microphone means located within said test module and means for electrically interconnecting said microphone means with said external test device.

32. The invention as recited in claim 31 wherein said test module further includes microphone retaining means for housing said microphone means 33. The invention as recited in claim 32 wherein said microphone retaining means include a soft, flexible cushion disposed between said test module and said microphone means.

34. A stock auditory canal hearing aid to be inserted into the right auditory canal of a user which is prefabricated from modular elements which are mass produced prior to fitting the user with a hearing aid, the hearing aid comprising:

a prefabricated earshell assembly for said right auditory canal comprising a preshaped and precast hollow rigid body having a generally D-shaped opening to the environment adjacent the right ear oriented with the curved position of said D-shaped opening toward the back of said right ear, a tapered portion having an inward hook and an upward twist, and at least one inner opening to the right eardrum;

cover means for closing said D-shaped opening to the right outer ear;

a premolded soft, resilient, malleable covering fixed to the exterior of said rigid body having a tip which extends beyond the eardrum end of the rigid body, the tip having an ovoid shape and being of sufficient length for deep penetration of the ear canal so that the tip extends past the first bend in the ear canal and penetrates the ear canal to a depth of three eighths to three quarters of the depth of the ear canal;

microphone means located within said right earshell assembly;

receiver means located within said right earshell assembly;

amplifier means located within said right earshell assembly;

means within said right earshell assembly for interconnecting said microphone means, said amplifier means and said receiver means; and a battery source located within said right earshell assembly for supplying power to said amplifier means.

35. The invention as recited in claim 34 wherein said right earshell assembly further includes:

a soft, flexible, pliant covering of one of a selectable plurality of thicknesses and shapes having a generally D-shaped opening to the environment adjacent the right ear oriented with the curved portion of said D-shaped opening toward the back of said right ear, a tapered portion having a forward and inward hook and an upward twist, and at least one inner opening to the right eardrum, said covering being fixed to the exterior of said rigid body and resiliently conforming to the interior of said right auditory canal.

36. A stock auditory canal hearing aid to be inserted into the left auditory canal of a user which is prefabricated from modular elements which are mass produced prior to fitting the user with a hearing aid, the hearing aid comprising:

a prefabricated earshell assembly for said left auditory canal comprising a preshaped and precast hollow rigid body of singular size and shape having a generally D-shaped opening to the environment adjacent the left ear oriented with the curved portion of said D-shaped opening toward the back of said left ear, a tapered portion having an inward hook and an upward twist, and at least one inner opening to the left eardrum;

cover means for closing said D-shaped opening to the left outer ear;

a premolded soft, resilient, malleable covering fixed to the exterior of said rigid body having a tip which extends beyond the eardrum end of the rigid body, the tip having an ovoid shape and being of sufficient length of deep penetration of the ear canal so that the tip extends past the first bend in the ear canal and penetrates the ear canal to a depth of three eighths to three quarters of the depth of the ear canal;

microphone means located within said left earshell assembly;

receiver means located within said left earshell assembly;

amplifier means located within said left earshell assembly;

means within said left earshell assembly for interconnecting said microphone means, said amplifier means and said receiver means; and a battery source located within said left earshell assembly for supplying power to said amplifier means.

37. The invention as recited in claim 36 wherein said left earshell assembly further includes:

a soft, flexible, pliant covering of one of a selectable plurality of thicknesses and shapes having a generally D-shaped opening to the environment adjacent the left ear oriented with the curved portion of said D-shaped opening toward the back of said left ear, a tapered portion having a forward and inward hook and an upward twist, and at least one inner opening to the left eardrum, said covering being fixed to the exterior of said rigid body and resiliently conforming to the interior of said left auditory canal.

38. A stock in-the-canal hearing air to be inserted within the concha and meatus of a patient which is prefabricated from modular elements which are mass produced prior to fitting the patient with a hearing aid, the hearing aid comprising:

a preshaped and precast thin shelled rigid core constructed to have one end facing the environment and the other end facing the eardrum of the patient characterized by a forward and inward hook and an upward twist of that portion of the shell which extends from the concha into the meatus of the patient and a premolded soft, resilient, malleable covering fixed to the exterior of said rigid core having a tip which extends beyond the eardrum end of the rigid core, the tip having an ovoid shape and being of sufficient length for deep penetration of the ear canal so that the tip extends past the first bend in the ear canal and penetrates the ear canal to a depth of three eighths to three quarters of the depth of the ear canal.

39. The hearing aid of claim 38 wherein the hearing aid is further characterized by a patient selectable one of a plurality of soft resilient covers securely affixed to the exterior of the core each of the plurality of soft covers interiorly conforming to the forward and inward hook and upward twist of the shell and the selected cover exteriorly being of a size and dimension of fit comfortably within the ear canal of the patient, the selected covering having an ovoid shape which substantially conforms to the diameter of the ear canal.

40. The hearing aid of claim 38 for use within a patient's ear canal having a plurality of bends wherein the hearing aid is characterized by having a soft malleable cover which comfortably conforms to at least one bend present in the patient's ear canal.

41. The hearing aid of claim 38 wherein the hearing aid comfortably conforms to at least two bends present in the patient's ear canal.

42. The hearing aid of claim 40 wherein the hearing aid penetrates over three-eighths of the length of the patient's ear canal.

43. The hearing aid of claim 40 wherein the hearing aid penetrates three-fourths of the length of the patient's ear canal.

44. A stock hearing aid comprising a hard shell having a first portion and a second portion, the second portion being tapered and having a forward and inward hook and an upward twist which generally conforms to the geometry of a human ear canal characterized in that said hard shell is completely enveloped with a premolded soft pliable material which accommodates the individual characteristics and geometry of each user's ear canal having a tip which extends beyond the end of the second portion of the hard shell, the tip having an ovoid shape and being of sufficient length for deep penetration of the ear canal so that the tip extends past the first bend in the ear canal and penetrates the ear canal to a depth of three eighths to three quarters of the depth of the ear canal.

45. A stock hearing aid which is prefabricated from modular elements which are mass produced prior to fitting the user with a hearing aid, the hearing aid comprising a first portion which fits into the concha of the ear and a second portion which penetrates into the ear canal characterized in that the first portion of the hearing aid has a generally D-shaped cross-section with the flat side extending toward the front of the ear and the curved side extending toward the back of the ear and the second portion comprising a thin hollow shell having a soft, flexible, tip which is fixed to the exterior of said hollow shell, the tip extending beyond the eardrum end of the hollow shell, the tip having an ovoid shape and being of sufficient length for deep penetration of the ear canal so that the tip extends past the first bend in the ear canal and penetrates the ear canal to a depth of three eighths to three quarters of the depth of the ear canal.

46. A mass produced hearing aid comprising an earshell assembly which fits into the ear of a patient and electronic circuit components contained within the earshell assembly which establish the frequency response of the hearing aid characterized in that the earshell assembly comprises a hollow shell having a soft flexible tip which extends beyond the eardrum end of the earshell assembly the tip having an ovoid shape and being of sufficient length for deep penetration of the ear canal so that the tip extends past the first bend in the ear canal and penetrates the ear canal to a depth of three eights to three quarters of the depth of the ear canal and all of the electronic circuit elements are detachably removeable from the earshell assembly.

47. A prefabricated hearing air assembly which is prefabricated from modular elements which are mass produced prior to fitting the user with a hearing aid, the hearing aid assembly having a first cavity to contain the electronic components of the hearing aid assembly and a second cavity to vent the ear canal to the atmosphere surrounding the user of the hearing aid characterized in that the second cavity is formed by a hollow, thin shell having a soft flexible tip which extends beyond the eardrum end of the hollow shell, the tip having an ovoid shape and being of sufficient length for deep penetration of the ear canal so that the tip extends past the first bend in the ear canal and penetrates the ear canal to a depth of three eighths to three quarters of the depth of the ear canal and the size and capacity of the second cavity which vents the ear canal to the atmosphere is controllable by selecting one of a plurality of vent inserts, each of the plurality of vent inserts having a different sized aperture formed therein.

48. A hearing aid for insertion into a patient's ear having a first portion which is retained in the bowl of the ear and a second portion which extends into the ear canal of the patient characterized in that the second portion comprises a soft flexible tip having an ovoid shape and being of sufficient length for deep penetration of the ear canal so that the tip extends past the first bend in the ear canal and penetrates the ear canal to a depth of three eighths to three quarters of the depth of the ear canal which can be selectively shortened to accommodate the physical comfort of the patient and the geometry of the patient's ear canal.

49. A mass produced hearing aid comprising a hollow earshell assembly for insertion into a patient's ear and detachable electronics attached to an amplification module for insertion into the earshell assembly characterized in that the earshell assembly has at least one ridge formed around the periphery of the inner surface thereof and the amplification module comprises a plurality of bayonet tabs having bulbous ends, each of the tabs being directed toward the ridge in the earshell assembly, both the ridge and the bayonet tabs being formed of rigid but flexible material so that when the tabs are inserted into the earshell assembly the ridge deforms outwardly and the bulbous ends of the plurality of tabs deflect inwardly and when the bulbous ends of the tabs pass the ridge, the ridge assumes its normal position and the bayonet tabs resume their normal position so that the bulbous ends of the bayonet tabs are retained by the ridge of the earshell assembly.

50. A mass produced hearing aid comprising a hollow earshell assembly for insertion into a patient's ear and detachable electronics attached to an amplification module for insertion into the earshell assembly characterized in that the earshell assembly has at least one ridge formed around the periphery of the inner surface thereof and the amplification module comprises a plurality of bayonet tabs having bulbous ends, each of the tabs being directed toward the ridge in the earshell assembly, the ridge being formed of rigid but flexible material so that when the tabs are inserted into the earshell assembly the ridge deforms outwardly and when the bulbous ends of the tabs pass the ridge, the ridge assumes its normal position so that the bulbous ends of the bayonet tabs are retained by the ridge of the earshell assembly.

51. A mass produced hearing aid comprising a hollow earshell assembly for insertion into a patient's ear and detachable electronics attached to an amplification module for insertion into the earshell assembly characterized in that the earshell assembly has at least one ridge formed around the periphery of the inner surface thereof and the amplification module comprises a plurality of bayonet tabs having bulbous ends, each of the tabs being directed toward the ridge in the earshell assembly, the bayonet tabs being formed of rigid but flexible material so that when the tabs are inserted into the earshell assembly the bulbous ends of the plurality of tabs deflect inwardly and when the bulbous ends of the tabs pass the ridge, the bayonet tabs resume their normal position so that the bulbous ends of the bayonet tabs are retained by the ridge of the earshell assembly.

* * * * *